(12) United States Patent
Isshiki et al.

(10) Patent No.: US 6,952,380 B2
(45) Date of Patent: Oct. 4, 2005

(54) APPARATUS AND METHOD FOR RECORDING INFORMATION

(75) Inventors: Fumio Isshiki, Kokubunji (JP); Atsuko Kuroda, Hachioji (JP); Takayuki Ichihara, Tokyo (JP); Masafumi Mochizuki, Kokubunji (JP); Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 597 days.

(21) Appl. No.: 10/138,568

(22) Filed: May 6, 2002

(65) Prior Publication Data

US 2003/0043699 A1 Mar. 6, 2003

(30) Foreign Application Priority Data

Aug. 29, 2001 (JP) .......................................... 2001-259113

(51) Int. Cl.$^7$ ................................................. G11B 7/00
(52) U.S. Cl. ................ 369/13.33; 369/126; 369/112.23
(58) Field of Search .......................... 369/112.23, 13.33, 369/126; 360/328, 114

(56) References Cited

U.S. PATENT DOCUMENTS 5,481,386 A * 1/1996 Shimano et al. ......... 369/44.12

FOREIGN PATENT DOCUMENTS

| JP | 62-200507 | 2/1986 |
| JP | 2000-195002 | 12/1998 |

OTHER PUBLICATIONS

T. Rausch, P. Herget, J. Zhu, J.A. Bain, D.D. Stancil and T.E. Schlesinger, "Experimental Test Bed for Hybrid Recording", Optical Data Storage Topical Meeting 2001, Santa Fe, New Mexico, Apr. 2001, pp. 130–132.

* cited by examiner

*Primary Examiner*—Nabil Hindi
(74) *Attorney, Agent, or Firm*—Reed Smith LLP; Stanley P. Fisher, Esq.; Juan Carlos A. Marquez, Esq.

(57) ABSTRACT

A vertical magnetic recording apparatus is provided which can diminish thermal decay of magnetization to ensure a high reliability of the life of recorded information and which can stably effect the write of magnetic information. Light assist is performed by obliquely applying light to a gap between a main pole of a vertical recording head and a medium. The light is radiated from the head side of the apparatus with respect to the medium. Utilizing the present invention, the thermal decay of magnetization at room temperature is diminished, the life of the recorded information is increased, and the storage reliability of the disk is increased.

13 Claims, 11 Drawing Sheets

APPARATUS AND METHOD FOR RECORDING INFORMATION

CLAIM OF PRIORITY

This application claims priority to Japanese Patent Application No. 2001-259113 filed on Aug. 29, 2001.

BACKGROUND OF THE INVENTION

1. Field of the Invention

The present invention relates to a magnetic head for vertical recording involving an optical recording assist, a magnetic disk unit which carries the magnetic head for vertical recording, and information devices and products using the magnetic disk unit.

2. Description of the Background

Along with an increase in the capacity of a hard disk used in computer devices, the information recording density in a single recording surface is also increasing. In a magnetic disk unit, data is read from and written to a recording medium through a magnetic head. In order to increase the recording capacity per unit area of the magnetic disk, the surface recording density must be improved. However, as the recording density increases, the recording area (or "bit size") occupied by one bit on the recording medium decreases.

As the bit size decreases, the energy of one-bit of information approaches a thermal energy at room temperature, and the magnetically recorded information may become inverted or disappear entirely due to thermal fluctuations. This problem is referred to as thermal decay of magnetization.

In an intra-surface recording method that has been commonly adopted, bits of magnetic information are recorded so that the direction of magnetization faces an intra-surface direction of a medium. According to this method, however, recorded information is apt to be lost by thermal decay of magnetization. To address this problem, a vertical recording method wherein magnetization signal is recorded in a direction perpendicular to a medium is gaining attention. In this vertical recording method, magnetic information is recorded based on the principle that a single pole (either N or S pole of a magnet) is approximated to a recording medium. This method is advantageous in that it is easier to prevent an unintended change of the recorded information because interaction with an adjacent inverted magnetization bit can be reduced to a minimum.

The principle of this vertical recording method is shown in FIGS. 2 and 3. FIG. 2 shows the construction of a magnetic head called a "single pole type" vertical recording head, and FIG. 3 is a sectional view thereof. This head is also called a thin film magnetic head because it is fabricated in accordance with a thin film forming technique using lithography. In an actual hard disk unit or the like, this head portion is built into a part of a 1 to 3 mm square chip called a slider 4, which has a pad structure for floating attachment thereto. Therefore, this head portion is further called a slider type thin film magnetic head.

In a main portion of the head are disposed a main pole 1 and an auxiliary pole 2. The larger pole in the shape of a rectangular parallelepiped is the auxiliary pole 2 which is for feeding back a magnetic flux. The smaller pole, having a tapered end, is the main pole 1 which has a coil 3 formed therearound. A bottom shield 8 is disposed on the opposite side of the auxiliary pole 2.

Further, a magneto-resistive element 9 (MR element, GMR element, TMR element) is disposed in a gap between the bottom shield 8 and the auxiliary pole 2 to provide a reproducing head. The head of this structure is also called a shared pole thin film magnetic head because a head portion for recording and a head portion for reproduction are structurally separated from each other. The term "magnetic head" may generally be used to refer to a combination of both the recording head and the reproducing head.

By tapering an end of the main pole, a magnetic field is concentrated to generate a recording magnetic field. On the other hand, the auxiliary pole 2 functions to pick up a magnetic flux generated by the main pole and return it again to both coil 3 and main pole 1. The auxiliary pole 2 is preferably the larger pole and is in the shape of a pillar. The main pole 1 serves as a single pole corresponding to N or S of a magnet to effect recording. The head in question, therefore, is also called a single pole head or a single pole type vertical recording head. A magnetic metal, such as permalloy may be used as the material for the main pole 1 and the auxiliary pole 2.

The magnetic field generated from the main pole 1 is recorded on a medium 5 which comprises a disk and a recording film 6 formed thereon. A thin film of a hard magnetic metal such as TeFeCo may be used as the recording film 6. This recording film serves as a magnetic recording layer. This magnetic recording layer 6 is deposited on a soft-magnetic thin film 7 such as a thin film of permalloy to afford a magnetic recording medium for vertical recording. Together, this medium 5 is simply called a magnetic medium or a recording medium. This medium 5 is disposed near the head and is rotated in the direction of arrow 15. In the disk medium 5 the thus-recorded magnetic information is formed as a magnetic pattern corresponding to S and N of a magnet at the instant of separation from a trailing-side edge of the main pole 1, as shown in FIG. 20.

In the vertical recording method, by using such a magnetic head—medium combination, the recording magnetic field faces a direction substantially perpendicular to the recording film. In the information recorded by a vertical magnetic field, the N and S poles of adjacent bits are alternated or flipped. Thus, it is difficult to form a "loop" within the film surface, so that stability is maintained easily even against a slight rotation of the recording magnetization based on heat. This is in contrast to the intra-surface recording method in which such loops occur easily. Thus, the vertical recording method is more resistive to a thermal decay of magnetization than the intra-surface recording method.

In Japanese Patent Application JP-A-195002/2000 there is proposed a method wherein the vertical recording method and an optical assist or light assist magnetic recording method are combined together. The "light assist" means the irradiation of light to heat a medium. This combined method proposes applying the light assist method used in the conventional intra-surface recording method to the head used in the vertical recording method.

Further, in *Optical Data Storage Topical Meeting* 2001 (Santa Fe, N. Mex., April 2001), page 130, there is described a method wherein light assist is effected by introducing light from an opposite side of a medium from the magnetic head. According to this method, a transparent glass substrate is used as the medium substrate, and light is transmitted trough the glass substrate from an opposite side of the substrate and is condensed and radiated directly to a position just under a magnetic pole.

However, in the above apparatus of JP-A-195002/2000, the light assist method adopted therein is optimized on a hard disk in the conventional intra-surface recording method which has been slightly altered to record information vertically. There has been the problem that if this light assist method is applied to a conventional vertical recording, a satisfactory light assist effect cannot be exhibited. More particularly, in JP-A-195002/2000 there is adopted a structure wherein light is introduced to a gap between a main pole and an auxiliary pole with use of a waveguide to heat between both poles. In the intra-surface recording method, a magnetization pattern is formed only at a middle point between the two poles, and it is therefore intended to perform light assist at that point. However, in the vertical recording method using a head such as that shown in FIG. 3, a magnetic pattern is formed at an edge on the side opposite to the auxiliary pole 2 with respect to the main pole 1, as shown in FIG. 20. Therefore, such pole-to-pole heating as in the intra-surface recording method is inappropriate.

Further, according to the structure adopted in this intra-surface/vertical recording method, light is projected to a narrower gap than the wavelength of light through the use of an elongated waveguide, thus giving rise to the problem that the waveguide efficiency is poor and that a practical quantity of light does not reach a portion of the disk to be irradiated. More specifically, the width of the waveguide is smaller than the half wavelength of light, and the length thereof is as large as several microns, so that the quantity of propagated light decreases to substantially one ten-thousandth or less due to a waveguide cut-off phenomenon. In such a low efficiency waveguide structure, it is necessary to use a large-sized laser (such as of several W class) as a light source, and thus, the structure in question is not practical as a small-sized (private use) information terminal.

According to the light assist method described in *Optical Data Storage Topical Meeting* 2001 (Santa Fe, N. Mex., April 2001), page 130, wherein light is introduced from an opposite side of a medium, it is necessary, when assembling an apparatus, that a magnetic head 12 and an optical head 13 be disposed respectively on both sides of a medium 5 and that motions of the two heads be allowed to match and follow each other without any mechanical error, as shown in FIG. 5. In FIG. 5, reference numeral 20 denotes an optical fiber and numeral 22 denotes a rotary actuator. This apparatus construction is complicated both optically and mechanically, and an actual construction thereof as a hard disk unit results in increased costs.

SUMMARY OF THE INVENTION

The present invention preferably provides a vertical magnetic recording apparatus of simple construction capable of diminishing a thermal decay of magnetization, ensuring a high reliability of information recording life, and effecting a stable write of magnetic information. In at least one embodiment, a metallic main pole is used as a main pole of a thin film magnetic head in a vertical recording method and a metallic recording film is used as a magnetic recording medium. The two metals of the main pole and the medium are disposed in proximity to each other through a slight gap. Light is then directed to the gap at an angle (oblique angle) intermediate between the main pole and the medium surface, and the resulting near field effect is utilized to condense the light onto the medium located just under the main pole.

A magnetic pole functioning to form an edge of a bit cell will herein be designated a main pole, while a magnetic pole connected to the main pole magnetic-circuitwise and functioning to return a magnetic force generated by the main pole to the main pole via a medium will herein be designated an auxiliary pole. Likewise, a recording method wherein a recording magnetization recorded on a medium is mainly oriented in a direction perpendicular to the medium surface will herein be designated a vertical recording method, while a recording method wherein a recording magnetization is mainly oriented in an intra-surface direction parallel to the medium surface will herein be designated an intra-surface recording method.

JP-A-200507/1987 discloses a vertical magnetization recording/reproducing apparatus in which light is obliquely incident on a substrate. However, a main pole used therein comprises an amorphous carbon substrate and Mn-Zn ferrite film formed thereon which does not produce a near field effect such as that found the present invention. The "near field effect" as referred to herein indicates an effect (light condensing effect) of generating the concentration of an optical electric field in a region smaller than a region whose diameter is the half wavelength of light, and "near field light" as referred to herein indicates light produced by such a light condensing effect. The above reference uses ferrite to encode information on a specialized medium.

The present invention will now be described below in detail. The principle of the light assist method used in the present invention is illustrated in FIGS. 1 and 6, of which FIG. 1 is a perspective diagram and FIG. 6 is a sectional view. In both figures, the lower side is a medium disk and the upper side is a magnetic head.

A basic structure of the head is the same as that shown in FIG. 2, and is known as a vertical recording type thin film magnetic head. As a medium there is used a disk medium having a metallic magnetic recording film such as a film of TbFeCo. In a hard disk unit, the thin film magnetic head is approximated to an upper surface of the recording disk medium, and the disk is caused to rotate. With this rotation of the disk, there occurs a current of air, whereby the thin film magnetic head floats with buoyancy from the surface of the disk in a gap (floating gap) as small as about 5 to 30 nm. This floating of the magnetic head permits the head to scan the upper surface of the recording film while being spaced a predetermined distance from the disk.

In this state, the distance between a main pole in the magnetic head and the recording film of the medium is about 5 to 30 nm, and a certain distance is maintained. A rotational direction 15 of the disk 5 is the same as in a conventional vertical recording type disk unit. That is, as shown in FIG. 3, the rotational direction 15 corresponds to a direction in which a magnetization pattern is formed. In other words, a direction opposite to the auxiliary pole with respect to the main pole, i.e., a trailing-side direction of the main pole.

In this state, in the light assist method according to the present invention, a light beam 23 is directed to the gap between the metallic main pole, and the metallic recording film 5 from the side of the main pole and obliquely at an angle of about 45° to the surface of the medium, as shown in FIGS. 1 and 6. Usually, the wavelength of visible light is in the range of 450 to 700 nm, and the size of a light spot condensed by a lens can be reduced to only about three halves of the wavelength on the basis of an optical principle of diffraction limited. Therefore, the light spot size is sufficiently large in comparison with the gap of 5 to 30 nm between the main pole and the recording film of the medium, so that the light spot directed to the gap straddles and covers the main pole, the gap, and the medium (FIG. 1). That is, a light beam is radiated to the medium surface from the same side as the main pole, i.e., from the magnetic head side, in such a manner as to straddle the boundary portion between the medium and the main pole. In this state, information is written to the magnetic recording layer on the medium which is heated with the light beam.

For preventing a thermal decay of magnetization, a light assist method involving heating a medium with a light beam during recording is effective. According to this method, as shown in FIG. 4, a medium has a high coercivity which makes writing to the medium using a conventional magnetic head without using light assist virtually impossible. Such a highly coercive medium is radiated with light and is heated thereby. In this way the temperature of the medium is raised temporarily, thereby temporarily decreasing the coercivity (a force for preventing the inversion of magnetization of the medium and maintaining the magnetization) and permitting a write using a conventional head at that instant. During storage, the possiblity of thermal decay of magnetization is greatly reduced because the medium is held at room temperature.

By raising the temperature only at the time of write, it is possible to effect write even with a magnetic force generated in a conventional head. For example, in a head of a conventional structure wherein the film thickness of a main pole is set at 400 nm (which is rather thick), it is possible to write data at a high speed exceeding 250 Mbps, but because the tip size of a main pole is large, the magnetic flux density becomes sparse. Consequently, a write limit is encountered at about 2.8 kOe in terms of coercivity of the medium. For example, in the case of a medium having coercivity as high as 4 kOe such as a multi-layer medium with Co (cobalt) 2 nm/Pd (palladium) laminated repeatedly, it is impossible to write data. For making write possible without using light assist, it is necessary to newly fabricate a head structure with decreased main pole thickness and enhanced magnetic flux density, typically and at a great sacrifice of high frequency characteristics. In contrast therewith, according to the method of the present invention using light assist, because the coercivity on the medium side is decreased by the radiation of light, it becomes possible to write data to a medium having a high coercivity at room temperature, without sacrificing a high frequency characteristic and while using a conventional magnetic head structure.

Next, a description will now be given of a near field effect which occurs in this state. FIGS. 7 and 8 show a result obtained by calculating a distribution of optical electric field intensities which occur under the main pole in the arrangement of FIG. 1. Specifically, FIG. 7 illustrates a distribution of optical electric field intensities just under the main pole, and FIG. 8 illustrates a distribution of optical electric field intensities on a medium surface portion spaced 20 nm away from the main pole. Thus, in this calculation it is assumed that there is a gap (spacing) of 20 nm between the main pole and the medium. For the calculation a method known as FDTD is used. On the X axis side, one square is 10 nm, while on the Y axis side, one square corresponds to a length of 25 nm. A white region surrounded with oblique lines represents the shape of the main pole.

By a short-circuit effect induced by both metallic main pole and metallic medium, an optical electric field around the main pole is absorbed by the main pole and an optical electric field present near the surface of the metallic medium is absorbed by the metallic recording film of the medium, both decaying to near zero. The optical electric field energy thus absorbed concentrates in the foregoing gap of 5 to 30 nm between the main pole and the medium which the light spot straddles. This is based on the same principle as the principle of a lightning conductor, that is, based on the nature that electricity tends to be concentrated on a portion where resistance is as low as possible. Thus, there occurs a light condensing effect as if the light energy of the radiated light spot concentrated in the gap between the main pole and the gap, and there occurs a concentration of optical electric field which is several tens to at least two hundred times as high as the original optical electric field intensity (uniform).

However, the range of light condensed by this effect is limited to the size of about the half wavelength of light, and therefore this effect is induced by a near field light effect. The intensity of optical electric field thus condensed is higher in energy density by two orders of magnitude as compared with the original electric field intensity of the incoming optical electric field intensity.

This light condensing effect has a maximum in the case of FIGS. 1 and 6 wherein an assist light beam 23 is obliquely incident on both the medium and the main pole each at an angle of about 45°. If the angle is outside the range of 15° to 75°, the light condensing effect becomes extremely low. FIG. 19 shows an incident angle dependency of optical electric field intensity around a light-condensed portion. Actually, however, there occur various different distributions of optical electric field intensities according to pole sizes and spacings from the medium. Therefore, reference herein will be made only to qualitative properties on the angle dependence of an optical electric field intensity which occurs in the vicinity of the gap portion in a simplified system including two metallic surfaces intersecting each other at an angle of 90°, assuming that the gap width is much smaller than the wavelength of light and further assuming that there is no such surface resonance effect as plasmon.

An electric field intensity is determined and plotted from a phase difference of light between the amplitude middle portions (maximum amplitude points) of two points which are closest to each other with a gap therebetween, in a stationary wave wherein an optical electric field occurs near a gap of the intersecting portion. The abscissa represents the incident angle and the ordinate represents the optical electric field intensity in the vicinity of the gap. Values are normalized with a maximum value set to 1. If the angle is outside the range of 15° to 75°, an essential light condensing effect based on this effect drops by two orders of magnitude in comparison with an angle of approximately 45° at which the efficiency is maximized. At an angle of around 45°, corresponding to the maximum efficiency, the maximum electric field intensity just under the main pole was found to be about one hundred times the electric field intensity of incident light. It follows that if the angle is outside the range of 15° to 75°, the electric field intensity of the light condensing portion becomes lower than the original optical electric field intensity and there scarcely is obtained any light condensing effect.

Thus, in order to obtain a high efficiency, it is preferred that the incident angle fall under the range of 15° to 75°. It is near an incident angle of 45° that the light condensing efficiency becomes highest. From a more practical standpoint it is necessary that the light condensing efficiency is about half of the maximum efficiency. FIG. 22 is a diagram obtained by re-plotting the ordinate in FIG. 19 on a linear scale. From FIG. 22 it is seen that if the incident angle is outside the range of 35° to 55°, the efficiency becomes no more than half of the maximum efficiency, and in this case, most of the light energy which has not been used induces a side effect such as causing the generation of heat at another portion (medium or pole) which may exert a harmful influence on recording. To address such a potential inconvenience it is desirable that the incident angle fall under the range of 35° to 55°.

The polarization direction 24 (FIG. 1) of incident light in this case, although not shown in FIG. 22, obtains an effect when an optical electric field is oriented in a direction straddling both main pole and medium. When the medium is regarded as a reflective surface, the said direction corresponds to a polarization direction called P-polarized light with respect to the medium surface (light having a main polarization component in a direction perpendicular to the medium surface). In a polarized light as a component of S-polarized light having only an electric field component in a direction parallel to the medium surface, the light of a polarization component parallel to the gap does not act on the light condensing effect in question and therefore the resulting light condensing effect is less significant. Accordingly, it is preferable that the incident angle lie between 15° and 75° and that in case of using linearly polarized light such as laser light, the light be incident in the polarization direction of P-polarized light.

Another advantage of adopting the light condensing method according to the present invention is a mirrored image effect induced by the fact that the metallic recording film of the medium 5 is planar with respect to the main pole 1. According to the mirrored image effect, a condensed optical electric field intensity becomes a maximum in the main pole—medium gap on the side closest to the medium surface. This point will be explained below with reference to FIGS. 7 to 9.

The aim of light assist magnetic recording is heating a medium to lower the coercivity and writing magnetic information at this heating instant. However, if a main pole is heated together with the medium, the magnetic transfer characteristic of the main pole is deteriorated, with a consequent lowering of the maximum field strength which the magnetic head can generate. For this reason, as strong a magnetic field as possible is to be applied to the medium to ensure a proper write of magnetic information. In other words, heating of the main pole itself should be avoided.

In the light assist method according to the present invention, the main pole 1 stands up vertically (like a needle) with respect to the medium 5 and a mirrored image effect of inverting an electric field distribution (like a mirror) is created by the planar, metallic recording film as in FIG. 9. The electric field intensity of condensed light becomes a maximum on the medium surface position at a middle point between the main pole and a mirrored image 25 of the main pole opposed thereto. Conversely, the electric field intensity approaches zero on the main pole and the mirrored image of main pole, such that an optical electric field energy is not substantially concentrated on the main pole. This result is also reflected in the calculation result obtained by the FDTD method which is shown in FIGS. 7 and 8. It is seen that the distribution of optical electric field intensity is stronger on the medium surface (FIG. 8) than on the main pole surface (FIG. 7). Thus, the main pole itself is not heated as much, and light energy can be concentrated on only the medium to be heated. In this way, light assist may be stably effected with high efficiency.

Further, light is condensed onto the medium on the trailing side of the main pole, and the medium is thereby heated concentratedly, allowing magnetic information to be written during this irradiation of light, to effect light assist magnetic recording. For effecting light assist suitable for the vertical recording method, it is preferred that the trailing-side edge of the main pole and the vicinity thereof be heated in a concentrated manner. The said edge is located on the side opposite to the auxiliary pole 2 (FIG. 3). That is, the portion extending from just under the main pole up to the side opposite to the auxiliary pole with respect to the main pole is heated concentratedly. As seen from the electric field distribution shown in FIG. 8, the electric field intensity on this side in the figure (trailing side of the main pole) which corresponds to the light incidence side is, on the whole, comparatively strong. If light assist is performed using this strong electric field intensity, a heated region 11 can be centered at the portion extending from just under the main pole up to the side opposite to the auxiliary pole as shown in FIG. 10. That is, it is seen that light assist concentrated on the trailing side of the main pole, which is desired in the vertical recording method, can be realized.

Thus, the light assist method according to the present invention utilizes a concentrated heating on a medium based on both a near field-like light condensing effect and a mirrored image effect, wherein the former is created when a light beam is obliquely applied across a gap formed between a metallic main pole and a medium having a metallic recording film, the main pole and the medium being disposed in proximity to each other. To efficiently attain this heating, an incident light angle (with oblique incidence) of about 45° relative to the medium or the main pole is suitable. It is preferable that light having an optical electric field component perpendicular to the gap and being P-polarized light for the medium be used as an incident polarized light.

By adopting the light assist method according to the present invention, an optical path for the incidence of light can be disposed on the same side as the magnetic head with respect to the medium. That is, it becomes possible to constitute a slider which is an integral combination of a magnetic head and a light condensing optical system. It is no longer required to adopt such a method and apparatus as disclosed in the prior art literature of *Optical Data Storage Topical Meeting* 2001 (Santa Fe, N. Mex., April 2001), page 130, wherein an optical head is disposed separately on the side opposite to a magnetic head with respect to a medium, to "sandwich" the medium between both heads while matching the motions of both heads. It is also possible to construct a hard disk unit without adopting a mechanism using two-stage servo control at a high cost. The hard disk unit thus constituted is simpler in construction both optically and mechanically and is less expensive to produce. Also, a one-side drive becomes feasible, and both the surface and the back of the medium may be used as independent recording surfaces, thus permitting both-side recording. The recording density can therefore be doubled.

Moreover, the detecting resolution of a reproducing head using a magneto-resistive element is high. In other words, a reproducing head capable of clearly reproducing a bit cell which the main pole forms during recording can be fabricated in a relatively easy manner. By combining this method with the reproducing head using a magneto-resistive element, it is possible to realize a head which can effect both recording and reproduction of a fine cell in high efficiency.

By adopting the light assist method according to the present invention, even when the tip size of a main pole in the head is set small for forming a finer magnetic pattern, the size of a light spot condensed according to the size of the main pole tip automatically decreases on the basis of the light condensing principle of the method. Because a metal-to-metal electric field concentrating effect is used, it is possible to maintain a high light condensing efficiency even if the size of a condensed light spot is decreased, in comparison with the method wherein light is condensed using a waveguide or an aperture.

Consequently, a highly efficient light assist can be attained even in a high recording density exceeding 100 Gbit/in$^2$ (a hundred billion bits per square inch), and thus the light assist method according to the present invention is suitable for high-density recording.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

First Exemplary Embodiment

Figure 11:
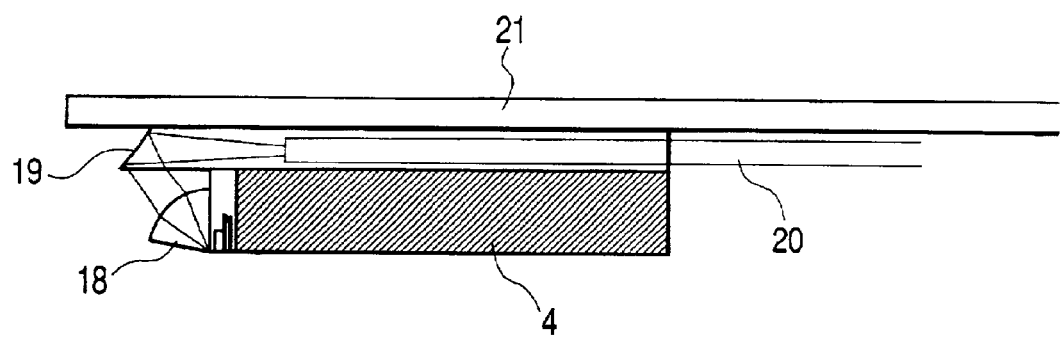
FIG. 11 is a side view showing an exemplary construction of an integral head which implements the light assist method according to the present invention.
Figure 12:
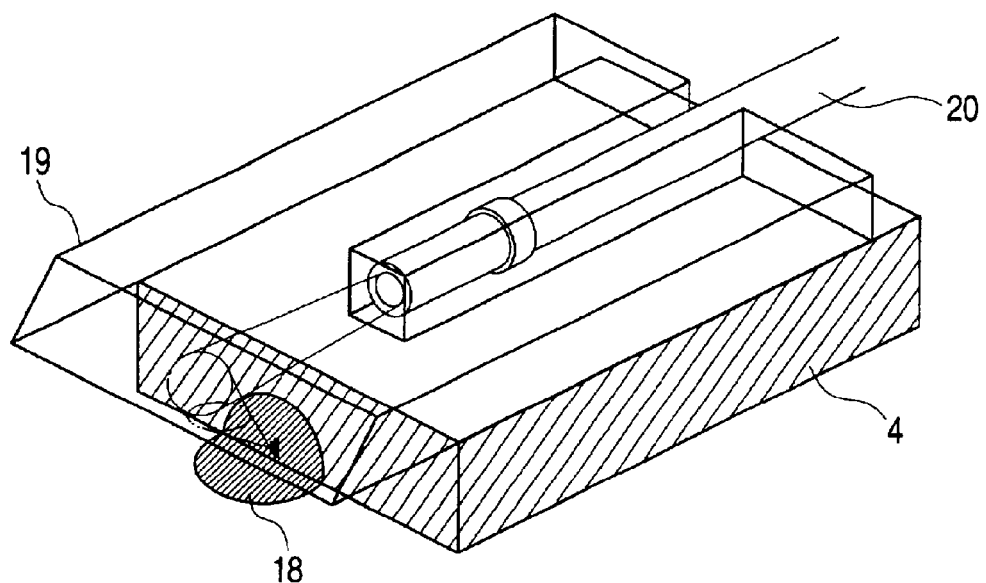
FIG. 12 is a perspective view thereof.

In this embodiment, a description will be given below of an apparatus for the supply of light using fiber. An example of a concrete construction of an optical system will be mentioned. FIGS. 11 and 12 show an information recording method and a construction example (Example 1) of an information recording apparatus using a light assist head according to the present invention. FIGS. 11 and 12 are a side view and a perspective view, respectively, of the same apparatus. In FIG. 12, a leaf spring 21 is omitted to make the figure easier to see.

Figure 1:
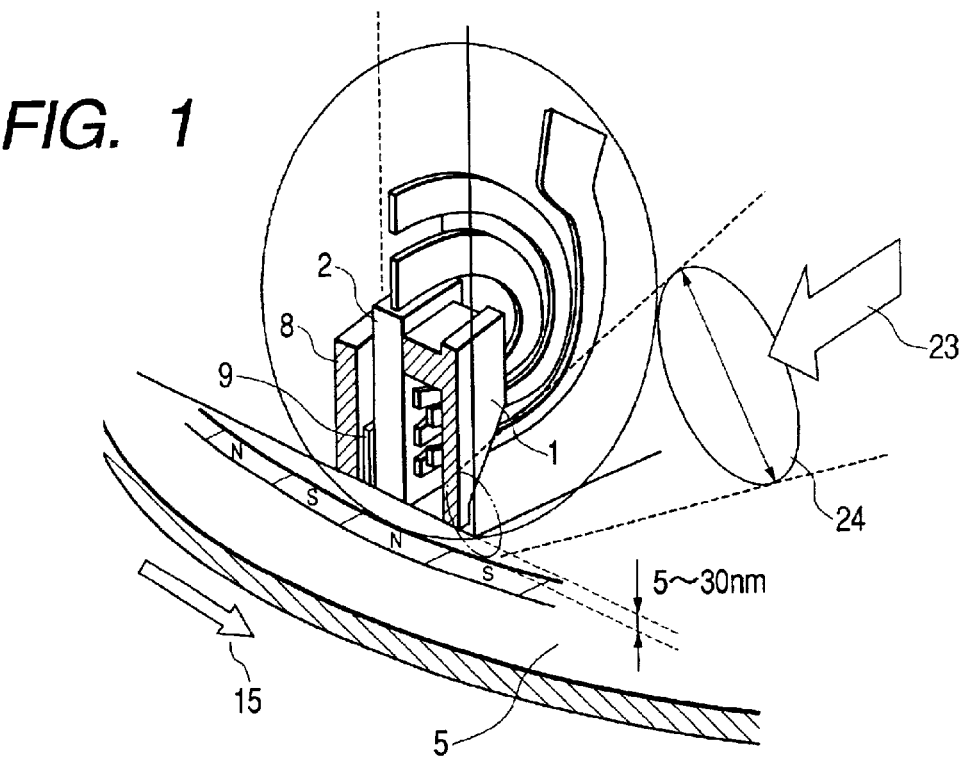
FIG. 1 illustrates a basic construction of a light assist method according to the present invention.
Figure 2:
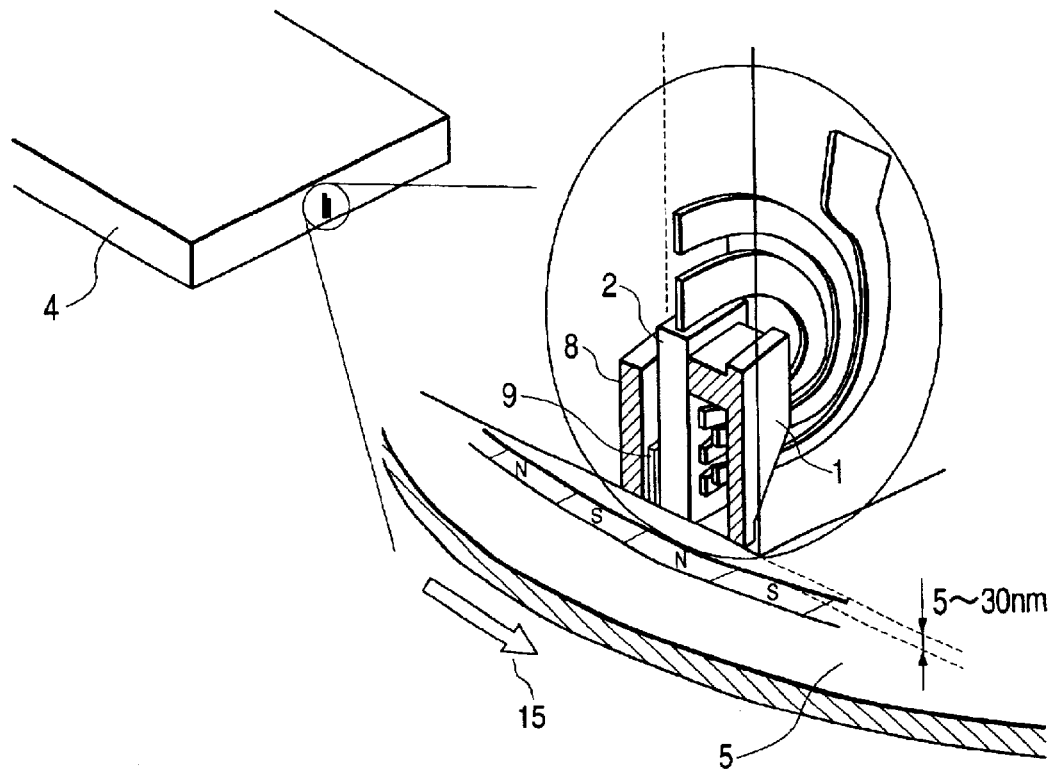
FIG. 2 illustrates the construction of a vertical recording head (conventional structure) built in a slider.
Figure 3:
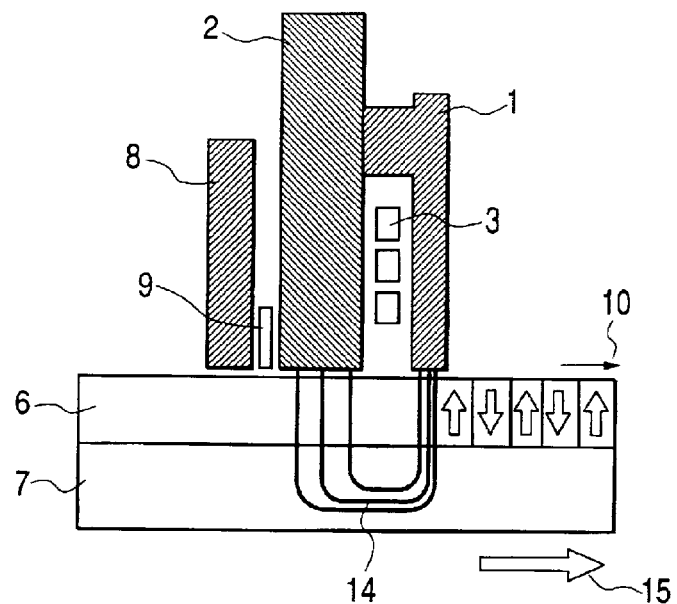
FIG. 3 illustrates an example of a sectional structure of the vertical recording head.
Figure 4:
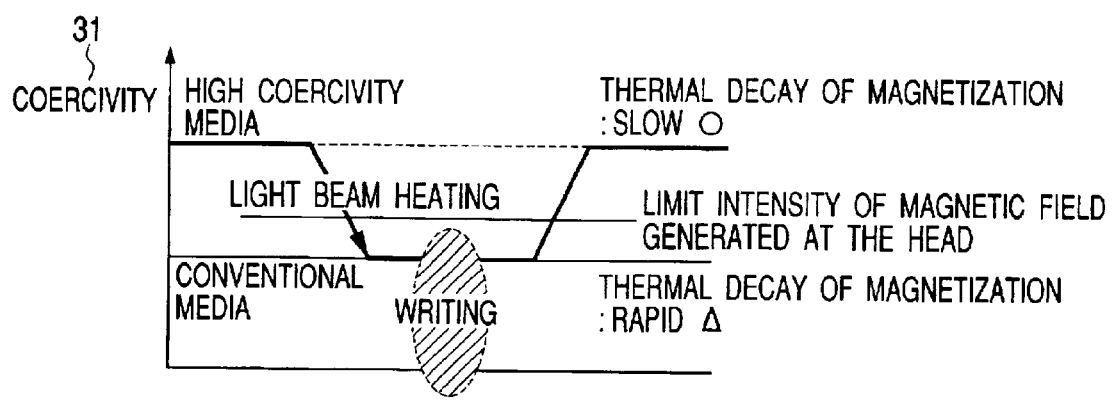
FIG. 4 illustrates both principle and effect of light assist.
Figure 5:
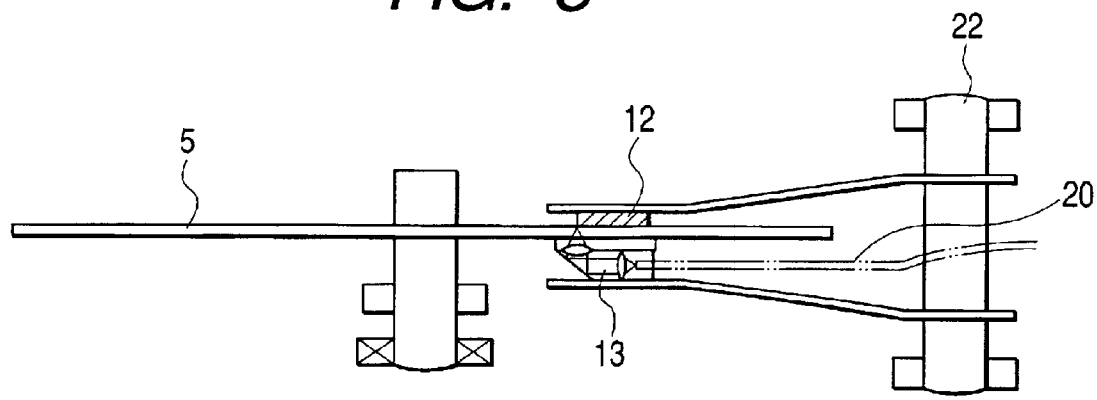
FIG. 5 illustrates an example of a conventional light assist method in which a magnetic head and an optical head are disposed in an opposed relation to each other.
Figure 6:
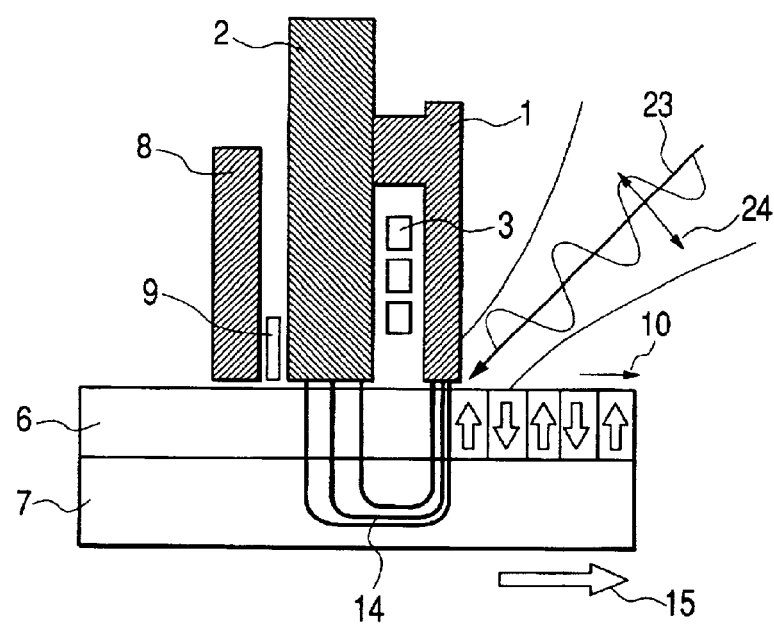
FIG. 6 is a sectional view illustrating a light assist method according to the present invention.
Figure 7:
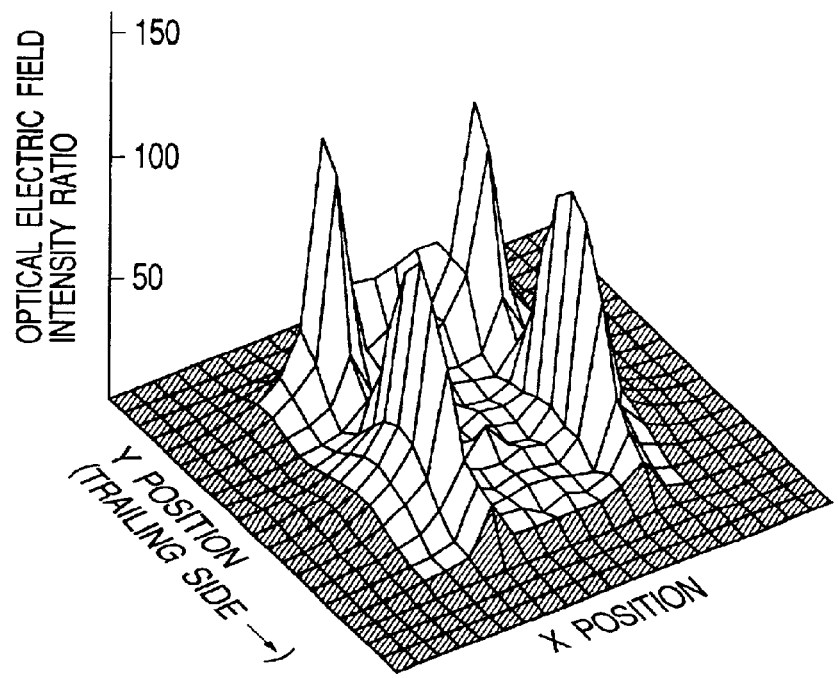
FIG. 7 illustrates a light intensity distribution just under a main pole in the light assist method according to the present invention.
Figure 8:
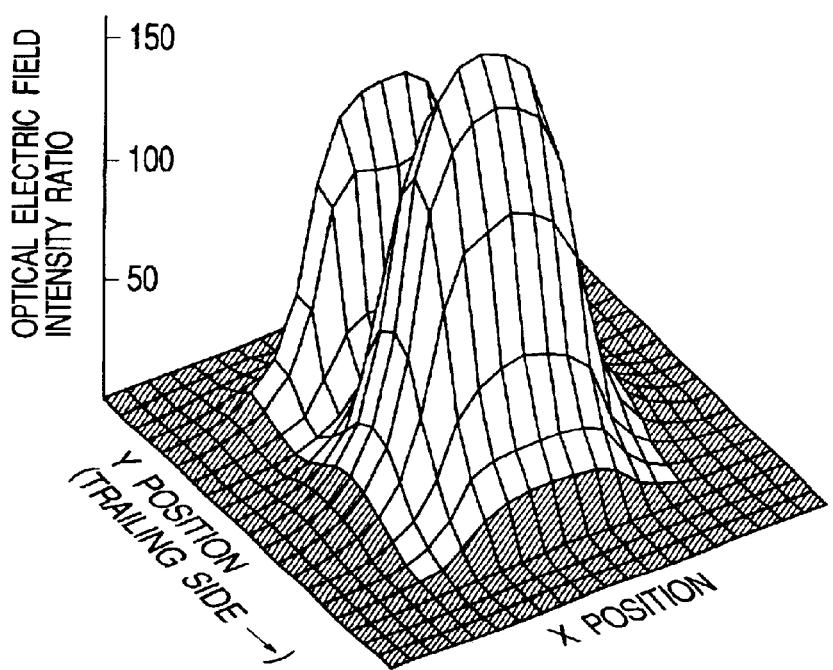
FIG. 8 illustrates a light intensity distribution on a surface of a medium in the light assist method according to the present invention.
Figure 9:
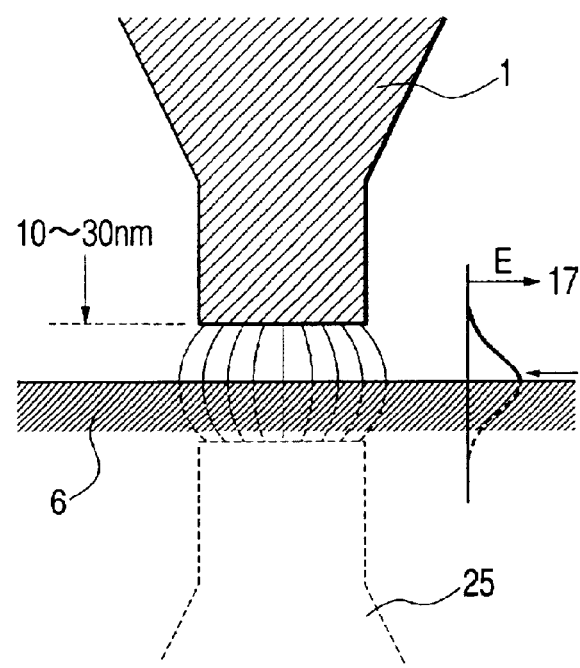
FIG. 9 illustrates a mirrored image effect created by an interaction of both a metallic main pole and a metallic medium.
Figure 10:
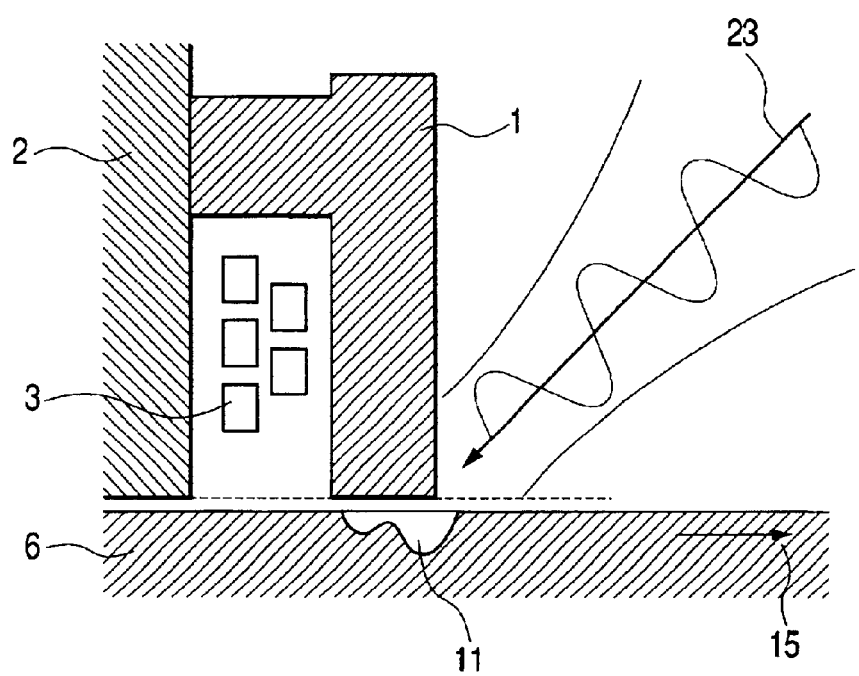
FIG. 10 illustrates a heated region which is heated concentratedly by the light assisting method according to the present invention.
Figure 13:
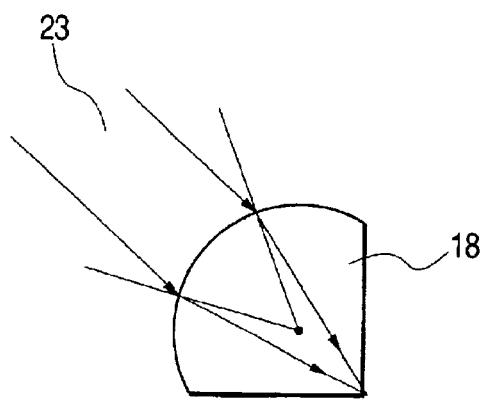
FIG. 13 illustrates the shape of a lens portion which is mounted on a slider.

A basic construction of a magnetic head portion is the same as in FIG. 1. The thin film magnetic head of the vertical recording type referred to earlier is disposed on a disk medium having a metallic, magnetic recording film. In a light condensing system for the incidence of light, a lens 18 obtained by cutting a ball lens into a size of about one fourth, namely, into a "sectorial" shape, is attached to the tip of a slider 4 in the thin film magnetic head so that a light beam may be directed incident on the lens obliquely at an angle of about 45° and may be condensed to a boundary portion between the tip of a main pole and the bottom of the slider. In actuality, the ball lens is not preferably cut exactly into a quarter, but is cut into the shape as shown in FIG. 13 in which a larger quantity of lens remains near the center.

A trapezoidal prism 19 is fixed onto the slider 4, and an optical fiber 20 is fixed onto the slider from a leaf spring side. The position and depth of a focal point can be adjusted by adjusting the position of the optical fiber 20. The adjustment may be made by means of an adjusting jig using a piezoelectric element. The magnetic head for vertical recording according to the present invention wherein light is condensed and radiated to the tip of a main pole can be fabricated by this method. All of these components, including the slider, are fixed onto a leaf spring 21 (which is called a "gimbal") and are softly supported so as to permit a change of angle in conformity with the recording medium surface.

A slanted face of the trapezoidal prism 19 is inclined at an angle of about 59° relative to the bottom. Light fed through the optical fiber is reflected toward the lens 18 side by this slanted face. The reflected light is emitted at an angle of about 45° from the trapezoidal prism and is incident obliquely on the lens 18. With use of such a trapezoidal prism 19, it is possible to ensure a sufficient area of contact of the magnetic head with the slider 4 while ensuring an optical path and keeping a proper positional relation between the optical system and the pole with high mechanical strength.

An opposite end of the optical fiber 20 is connected to a semiconductor laser or other light source through an optical switch to permit the introduction of laser light. For the radiation of heat, the semiconductor laser is separately disposed near an enclosure (case).

In this light assist method it is necessary that a condensed spot of light fed from the optical fiber be stably present in a boundary portion between a main pole (or a single pole) and a floating surface. According to this structure, because the lens 18 and the trapezoidal prism 19 are united or fixed onto the slider 4 with the vertical recording head present thereon, there accrues an advantage that the position of an optical axis relative to the main pole is kept constant even upon contact of the slider 4 with the surface of the medium. Moreover, since the connecting direction of the optical fiber 20 faces the same direction as the radial direction of the leaf spring 21, it is easy to adopt a structure wherein the optical fiber is fixed midway on the leaf spring. Because the optical fiber is also fixed onto the leaf spring 21, the burden imposed on a base portion of the connection with the trapezoidal prism 19 decreases, with improvement of durability as the result. Further, since the fiber 20 is fixed firmly, the optical axis itself becomes more stable. Even when the head is driven and moves in tracking, there optically is attained a positional stability of a condensed light spot. As a result, the assist can be stably accomplished.

Initial adjustment of a condensed light spot (focal position) to be directed to the tip of the main pole 1 is made by adjusting a bonded position of the lens 18 relative to the slider 4, a bonded position of the trapezoidal prism 19 relative to the slider 4, and a fixed position and angle of the optical fiber 20 relative to the trapezoidal prism 19. More specifically, the adjustment can be done by assembling the components while making adjustment with use of a micro-adjusting mechanism which uses a piezoelectric element.

In actual recording of information as apparatus, this construction is used, and there is performed light assist by light beam heating under the supply of light from the optical fiber at the time of writing magnetic information. In normal read, the supply of light from the optical fiber is cut off so as not to damage the magnetic information already written.

By combining the vertical magnetic recording method with the light assist method according to the present invention it is possible to effect vertical recording stably for a medium of a high coercivity exceeding 4 kOe even with use of a vertical recording magnetic head of a conventional structure. Even in the conventional vertical recording method not involving light assist it has been possible to utilize a medium with a coercivity of up to about 3 kOe, but with a coercivity of more than 3 kOe, a decrease of magnetization caused by a thermal decay of magnetization becomes conspicuous in several months at a recording density of 50 to 60 Gbit/in$^2$ (50 to 60 billion bits per square inch) and at room temperature. To ensure a high reliability of the life of recorded information at a high recording density of at least 100 Gbit/in$^2$ (100 billion bits per square inch) and at room temperature, it is necessary that magnetic information be capable of being written to a medium having a coercivity of not less than 4 kOe at room temperature. According to the present invention, even in light beam heating that increases the temperature by about 100° C., the coercivity can be lowered temporarily to a level of 2.5 kOe which permits recording with the conventional vertical recording head, and therefore even a medium having a coercivity as high as 4 kOe can be fully utilized. In this way it is possible to provide a hard disk unit with increased storage and reliability of information.

Although in the above construction example an approximately quarter-cut sectorial portion of a ball lens is used in a bonded state as the lens 18, the lens may be formed, for example, by solidifying a thermoplastic resin in the shape of a droplet or by using a circular mask as a mold and dry-etching a transparent buried layer, provided there is obtained an optical structure capable of condensing light to the boundary portion between the main pole and the slider bottom (floating surface). No limitation is made to the above example of lens construction.

In order not to spoil the light condensing characteristic of lens, quartz ($SiO_2$) is preferable to alumina ($Al_2O_3$) as a head buried medium in the thin film magnetic head for vertical recording. A single crystal of alumina is optically anisotropic and is likely to disturb the phase (wave surface) of light and obstruct the acquisition of a satisfactory light condensing characteristic at the time of condensing an obliquely incident light. Therefore, as a material not causing such a disturbance, quartz, which is optically isotropic, is preferred because it is less expensive and chemically stable.

Second Exemplary Embodiment

Figure 14:
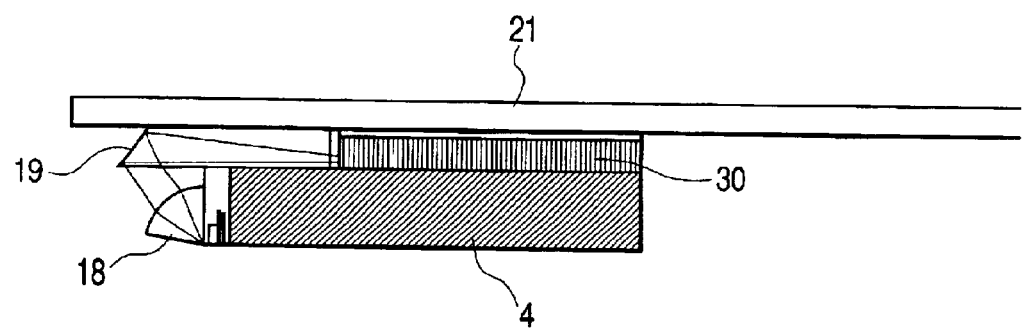
FIG. 14 illustrates an exemplary construction of an integral head which implements the light assist method according to the present invention.

In the above first embodiment reference has been made to an example of a light supply method using optical fiber. As another example of structure, a description will be given below of an example of structure with an integral laser diode chip. FIG. 14 shows an information recording method and an apparatus construction example (Example 2) using a light assist head according to the present invention.

The basic construction using the slider 4 and trapezoidal prism 19 in the magnetic head illustrated in FIG. 11 also applies to this embodiment. In this embodiment, however, the trapezoidal prism 19 is shortened, the optical fiber is omitted, and a laser diode chip 30 and wiring for driving the chip replaces the fiber (the provided electric wiring is omitted in the figure). Instead of the external supply of light using optical fiber, the laser diode chip 30 itself is rendered integral on the slider structure, thereby making both optical system and magnetic head integral with each other.

Since the magnetic head structure and the optical head structure are all fixed integrally onto the leaf spring 21, only wiring for a recording coil in the magnetic head, signal wiring for the magnetic reproducing head, and electric wiring for driving the laser diode chip 30 that are located outside this integral head structure. Even if the slider 4 contacts the medium surface while taking an angular match, all of the lens 18, trapezoidal prism 19, and laser diode chip 30 also change in direction simultaneously. An advantage accrues in that the position of the optical axis relative to the main pole is kept constant as in the previous first embodiment. Because the components of the optical system are concentrated on the leaf spring 21, it is possible to decrease the number of optical components, including optical fiber and optical switch, and it is only the same electric wiring as in the prior art that is drawn out as a connection wire from the leaf spring 21 and is bent at a movable part. Thus, the mechanical drivability, flexibility, and durability are very high as in a conventional hard disk unit which utilizes only magnetism.

Third Exemplary Embodiment

In the previous embodiments, reference has been made to a construction example on the head side from the leaf spring in the head using the light assist method according to the present invention. Next, with reference to FIGS. 15 and 16, a description will be given below about an entire construction example of a hard disk unit using the light assist method according to the present invention.

Figure 15:
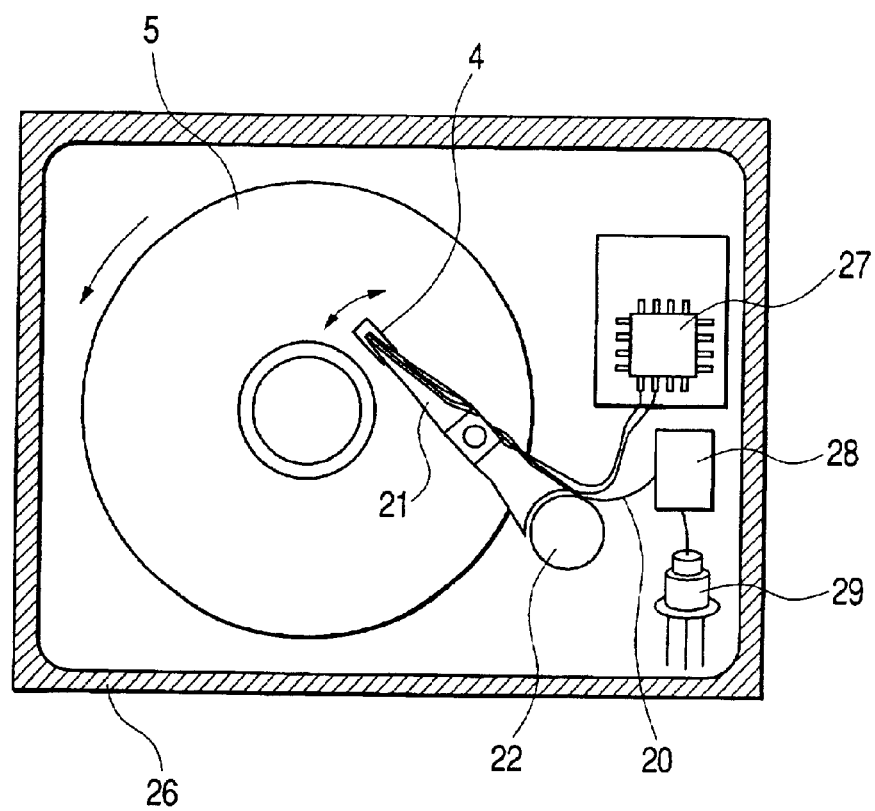
FIG. 15 illustrates an exemplary construction of a hard disk unit using the light assist method according to the present invention.
Figure 16:
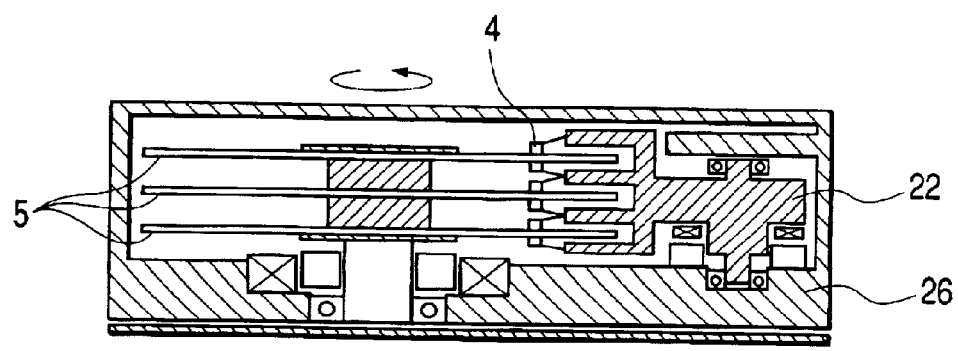
FIG. 16 is a sectional structural diagram of hard disk.

In the hard disk unit shown in FIG. 15, light is fed through an optical fiber to effect light assist. The slider 4 in the thin film magnetic head for vertical recording integral with the trapezoidal prism shown in the first embodiment is attached to the tip of the leaf spring 21, the optical fiber 20 is disposed along the leaf spring 21 and is connected to a semiconductor laser 29 through an optical switch 28, and assist light is fed from the semiconductor laser 29. According to the construction of this embodiment, assist light is fed using an optical fiber 20 as in the first embodiment, but in case of using such a structure as the second embodiment wherein a laser diode chip 13 is integral with the slider, both optical fiber 20 and optical switch 28 are not necessary and may be omitted.

The leaf spring 21 with the slider 4 in the vertical recording thin film magnetic head thereon is rotated radially by means of a drive mechanism for tracking positioning called a rotary actuator 22. A disk-like recording medium 5 is rotated by means of a rotor. Using a current of air produced with the rotation, the slider 4 is allowed to float a slight distance of 5 to 30 nm above the medium. In this state there is realized what is called a tracking servo control involving amplifying a reproduction signal by a read/write amplifier 27 which signal is obtained from the magneto-resistive element, detecting a tracking signal and thereby scanning over a certain radius on the disk.

Information is read by the restoration of data from the reproduction signal thus obtained. For writing, an electric current which has been modulated in accordance with recording data from the read/write amplifier 27 is fed to the coil in the thin film magnetic head for vertical recording and at the same time the semiconductor laser is turned ON for the supply of assist light. This assist light is condensed and fed to the main pole in the magnetic head through the optical fiber 20, trapezoidal prism, and lens structure. With the assist light, the recording film on the medium positioned just under the main pole is heated, and a magnetic field generated by the coil is fed to a coercivity-decreased portion of the medium to write magnetic information therein. After the write, the medium leaves the main pole with rotation of the disk, the medium is cooled quickly to room temperature, permitting the magnetic information to be held stably thereafter. According to this method it is possible to stably write magnetic information to a medium with a coercivity exceeding 3.5 to 4 kOe at room temperature. Because the semiconductor laser generates heat, it is preferably disposed near an outer wall of a case which is called an enclosure 26. A waveguide type optical switch (optical selector), as the optical switch 28, is provided at the midpoint of the optical fiber so that the assist light fed from the semiconductor laser can be switched for a plurality mediums.

Fourth Exemplary Embodiment

In this embodiment a multi-layer structure of a medium will be described. If the light assist method according to the present invention is used for a medium of a multi-layer structure rendered highly coercive by adopting the multi-layer structure and formed by repeating Co (cobalt) and Pd (palladium) layers, for example, it is also possible to improve the signal/noise ratio of the reproduction signal.

Figure 21:
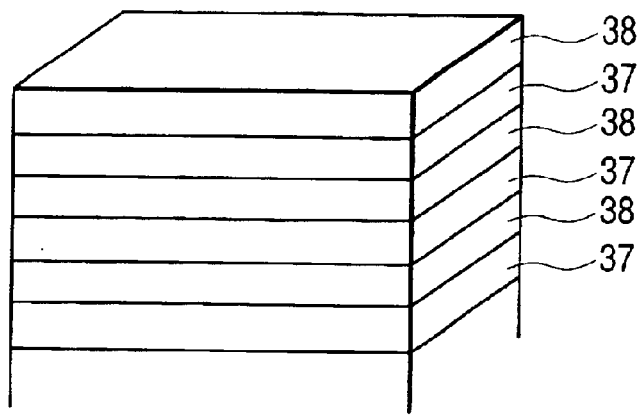
FIG. 21 illustrates an exemplary recording layer structure for vertical recording formed by repeatedly laminating a plurality materials with different magnetism.
Figure 22:
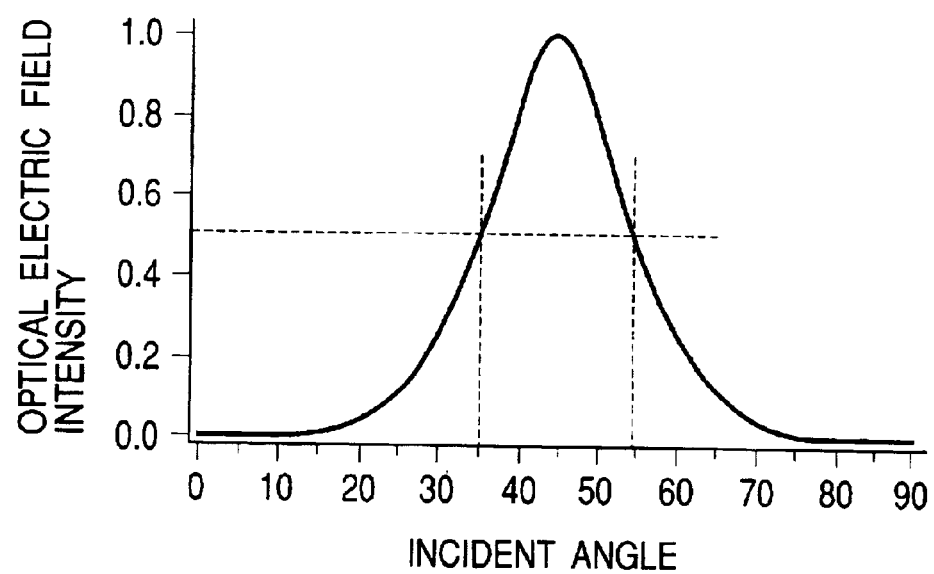
FIG. 22 illustrates an exemplary change of an optical electric field intensity relative to an incident angle of light, with the ordinate being re-plotted on a linear scale.

The medium of a multi-layer structure as referred to herein indicates a recording film (layer) obtained by repeatedly laminating plural materials different in magnetism (non-magnetism/ferromagnetism/antiferromagnetism). A typical example is a medium wherein a ferromagnetic material (cobalt or iron) and a non-magnetic material (platinum or palladium) are laminated alternately. The characteristic of antiferromagnetism is created on the basis of a layered or interfacial structure of compounds; for example, it is created by a combination of any of the above materials and a ruthenium-based material. A medium of a multi-layer structure is formed by a combination of a plurality of materials having magnetism such as those referred to above. An example of such a medium is shown in FIG. 21 wherein a multi-layer structure of cobalt 2 nm and platinum 1 nm is used as a recording layer.

In the medium of such a multi-layer structure, since the magnetic anisotropy is improved by using the multi-layer structure, the burden on the write head increases for the inversion of a magnetic charge. With the construction according to the present invention, it is possible, by light assist, to lighten the said burden and diminish the deterioration of coil in the magnetic head caused by use.

Fifth Exemplary Embodiment

Figure 17:
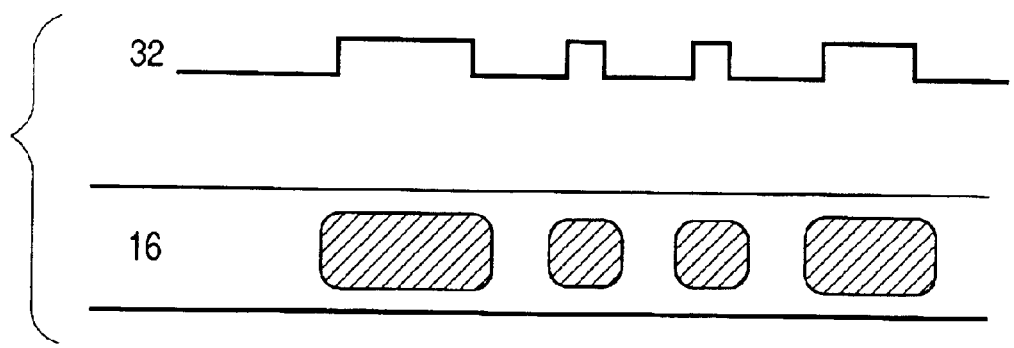
FIG. 17 illustrates an exemplary correspondence between bit cells and optical modulation.

In this embodiment, reference will be made to the writing of information by laser light modulation. As an application of light assist, the writing of information can also be accomplished by modulating the laser light itself. More specifically, a magnetic field generated by the coil is oriented in a certain direction (application of a DC magnetic field) and the laser light intensity of assist light, indicated at 32, is turned ON and OFF for modulation as in FIG. 17, thereby modulating the magnetic field to be recorded on the medium and allowing bit cells 16 to be formed for recording data. The laser light intensity modulating speed can be increased up to about 40 Gbit/sec., and therefore the recording modulation speed which encounters a limit at the cut-off frequency of the conventional coil can be further increased. Since the recording magnetic field information can be modulated with light, without relying on the inductance of coil which generates a magnetic field, the information recording speed can be increased to 10 to 100 times the present speed. For recording data by this method, it is necessary to erase previous data on the medium and regulate magnetization in one direction beforehand.

More specifically, while laser light is radiated DC wise beforehand with the recording head, a DC magnetic field is applied by the magnetic head to regulate magnetization in one direction. Thereafter, the electric current to be fed to the coil is inverted to invert the magnetic field generated by the magnetic head and in this state the laser is turned ON and OFF for modulation, whereby only when the laser is ON, the coercivity of the medium becomes lower than the magnetic field generated by the magnetic head, whereby inverted magnetization information is recorded as in FIG. 17.

In this method, the information recording speed is limited by heating of the medium and cooling thereof based on heat diffusion. As to the modulation of laser light intensity, there can be attained a high speed of 10 GHz or more by, for example, a combination of a DC laser light source and an optical modulator (a multiple quantum well type), which speed is much higher than the speed limited by both heating of the medium and cooling by heat diffusion. Thus, by improving the medium structure it is possible to further increase the information recording speed beyond the frequency limit based on the coil inductance of the conventional magnetic head.

The information recording apparatus according to the present invention permits, by light assist, the use of a medium having a high coercivity as a recording material, information can be stably held over a long period even in high-density recording with a reduced bit size. Since the life of recorded information may be prolonged, the information recording apparatus according to the present invention can be utilized in a computer device for the storage of information. It can also be utilized in a portable information terminal because the information recording density can be enhanced and the apparatus is superior in compactness and highly resistive to a working temperature environment.

Figure 18:
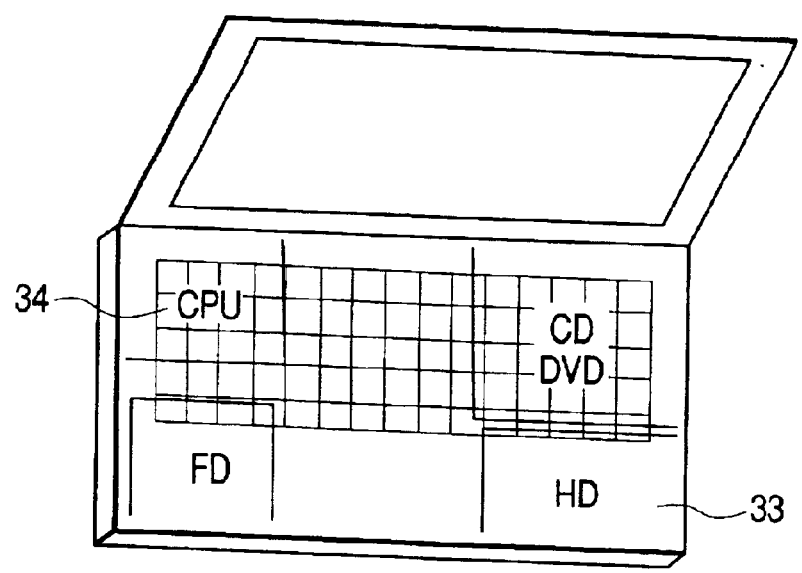
FIG. 18 illustrates a layout example of devices in a portable personal computer.
Figure 19:
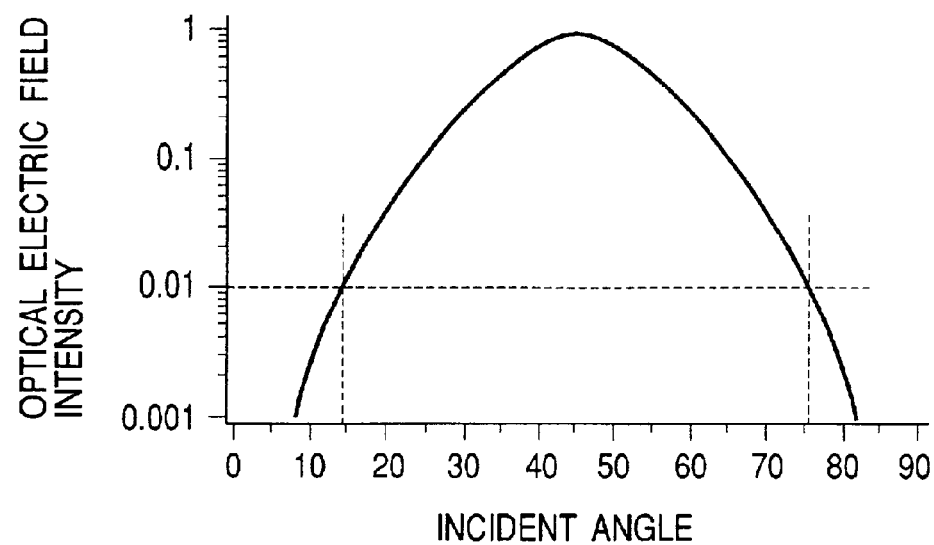
FIG. 19 illustrates an exemplary change of an optical electric field intensity relative to an incident angle of light.
Figure 20:
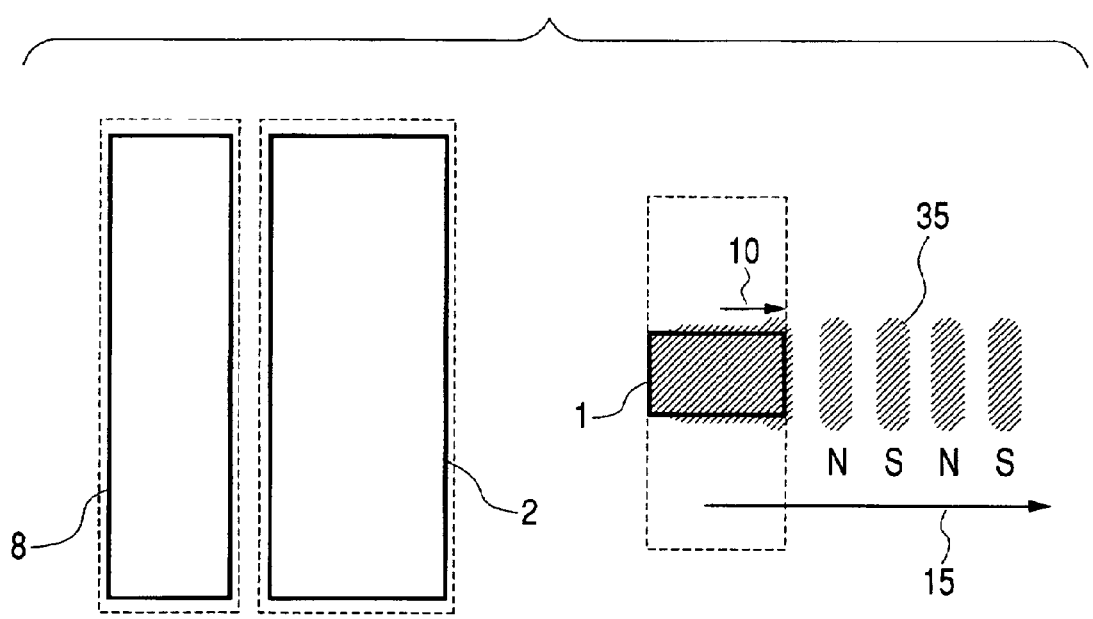
FIG. 20 illustrates the manner in which a magnetic pattern is formed on a disk medium by means of a vertical recording head.

Particularly, in a portable personal computer called notebook type, it is necessary, for preventing the loss of information by a thermal decay of magnetization, to dispose a hard disk unit 33 (HD) apart from a central processing unit 34 (CPU) whose temperature rises during operation, as shown in FIG. 18, thus giving rise to inconvenience in layout. In the hard disk unit to which the present invention is applied, the resistivity to a working temperature environment is kept high by using a highly coercive recording medium and light assist, so the freedom of layout is enhanced in a positional relation to the device serving as a heat source; for example, the hard disk unit can be disposed near the central processing unit.

Another advantage of the present invention is that even with use of a medium having a conventional degree of coercivity, there suffices even a small magnetic field generated in the recording head which is necessary for write, so it is possible to effect write stably even if the number of turns of the recording coil is decreased. Consequently, the inductance (AC resistance) of the coil is reduced, and it is possible to increase the magnetic field modulation speed during write. As a result, the amount of information capable of being recorded per second can be increased and it is possible to allow the hard disk unit to record information at a higher speed. This permits the application of the present invention to information storage devices and computer devices for which it is required to record and reproduce information at a higher speed.

A further advantage of the present invention is that there a small magnetic field generated in the recording head is sufficient for a write operation which therefore reduces the electric current on the head coil during recording. Accordingly, it is possible to prevent thermal damage caused by allowing an electric current close to a limit current repeatedly through the head coil, so that the information recording apparatus of the invention is applicable to computer devices which require a high reliability, particularly for long-term use.

As set forth above, in the magnetic head used in the information recording apparatus according to the present invention, because the main pole itself is used as a probe, it is not necessary to provide an aperture or an optical waveguide, and it is possible to effect light assist with high efficiency for a fine region which is necessary for high-density recording.

Light is fed by a semiconductor laser or other source only when required for the writing of information to lower the coercivity of the medium instantaneously, whereby information can be written with little burden on the recording head. The information thus recorded can be stored in a long life with little thermal decay of magnetization. Further, since the electric current on the head coil may be greatly reduced during recording, it is possible to diminish a thermal damage or failure of the coil and hence improve the reliability of the apparatus. The apparatus life can be greatly prolonged.

By the light assist recording according to the present invention, magnetic information can be recorded and reproduced using a recording medium having a-higher coercivity, even with use of a conventional vertical recording head. Particularly, since light beam heating just under a magnetic pole, which has posed a problem in the conventional light assist method, can also be effected, it is possible to ensure a sufficient heating time and-the size of heating range can be set within a track pitch which is determined automatically by the shape of the main pole. This is advantageous to the narrowing of the track and permits the attainment of a higher density. Since recording is made while raising temperature by light assist, the working environment temperature can be set higher than room temperature, and it is possible to use a highly coercive medium as a recording medium, whereby the reliability for the working environment can also be enhanced.

By using the light assisted magnetic head for vertical recording described above, it is possible to provide a highly reliable hard disk unit with reduced thermal decay of magnetization at room temperature and having a long information storage life with use of a highly coercive recording medium, even in high-density recording. Moreover, since both the surface and the back of a medium can be used as recording surfaces, it is possible to provide a light assisted information recording apparatus having a higher recording density.

According to the present invention, as set forth above, by utilizing an optical electric field which is concentrated in the gap between a metallic main pole and a metallic recording medium, a highly efficient light assist can be realized in combination with a vertical recording magnetic head. Thus, using a highly coercive recording medium, it is possible to provide a hard disk unit which is higher in density, has reduced thermal decay of magnetization at room temperature, has a long life for the recorded information, and is high in storage reliability.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A method for recording information, comprising the steps of:
   providing a metallic pole;
   disposing a metallic medium having a magnetic recording layer in proximity to said pole; and
   generating a near field light between said pole and said medium, said light aiding in the recording of information in the magnetic recording layer,
   wherein the near field light is generated by applying light from a light source to a location between the medium and the pole at an oblique angle with respect to the medium.

2. The method of claim 1, wherein said oblique angle in the range of 15 to 75 degrees relative to the medium.

3. The method of claim 1, wherein said oblique angle in the range of 35 to 55 degrees relative to the medium.

4. The method of claim 1, further comprising the steps of:
   applying a DC magnetic field from the pole to the medium; and
   modulating said near field light to effectuate the recording of information in the medium.

5. The method of claim 1, wherein the medium rotates and the light is obliquely incident in the rotating direction of the medium.

6. An apparatus for recording and reproducing information, comprising:
   a metallic pole, wherein said pole is adapted to be placed in proximity to a metallic recording film; and
   a light source, wherein said light source is adapted to obliquely radiate light to a boundary portion between the pole and the medium from a trailing side of the pole.

7. The apparatus of claim 6, wherein the oblique radiation of light is performed at an angle of 15 to 75 degrees relative to the medium.

8. The apparatus of claim 6, further comprising:
a magneto-resistive element for reproducing information recorded on the medium.

9. The apparatus of claim 7, further comprising:
a lens for condensing the light to a location between the medium and the pole; and
a slider, wherein said pole, said light source, and said lens are attached to said slider.

10. The apparatus of claim 6, wherein the pole is buried in quartz.

11. An apparatus for recording and reproducing information, comprising:
a metallic pole, wherein said pole is adapted to be placed in proximity to a metallic recording film;
a light source, wherein said light source is adapted to obliquely radiate light to a boundary portion between the pole and the medium from a trailing side of the pole;
a trapezoidal prism which reflects the light from the light source;
a lens for condensing the light reflected from the trapezoidal prism; and
a slider, wherein said pole, said prism, and said lens are attached to said slider.

12. The apparatus of claim 11, further comprising:
an optical fiber for directing light from said light source, wherein said pole is included in a magnetic head, and further wherein said head and said optical fiber are fixed onto gimbals.

13. The apparatus of claim 11, wherein said light source is a laser diode chip, further wherein said pole is included in a magnetic head, and further wherein said head and said laser diode are fixed onto gimbals.

* * * * *